United States Patent [19]

Lee et al.

[11] 4,258,931

[45] Mar. 31, 1981

[54] AIR BAG SYSTEM FOR AUTOMOBILES

[76] Inventors: Joseph K. Lee, 10616 Bramblebush Ave., Whittier, Calif. 90604; Richard J. Lee, 2205 Calle Taxco, West Covina, Calif. 91791

[21] Appl. No.: 859,729

[22] Filed: Aug. 17, 1978

[51] Int. Cl.³ .............................................. B60R 21/08
[52] U.S. Cl. ..................................... 280/734; 280/739
[58] Field of Search ............... 280/734, 735, 728, 729, 280/732, 733, 736, 739, 741, 742, 743; 180/103 A

[56] References Cited

U.S. PATENT DOCUMENTS

| | | | |
|---|---|---|---|
| 2,834,606 | 5/1958 | Bertrand | 280/730 |
| 2,868,309 | 1/1959 | Burgess | 180/103 A |
| 3,495,675 | 2/1970 | Hass | 280/735 |
| 3,625,543 | 12/1971 | Wolff | 280/740 |
| 3,797,603 | 3/1974 | Loomba | 180/103 A |

FOREIGN PATENT DOCUMENTS 1332051 10/1973 United Kingdom ..................... 280/733

*Primary Examiner*—John P. Silverstrim

[57] ABSTRACT

An air bag system to protect occupants of automobiles against injury in case of collision. An air bag is housed, when empty, in a tapered open container in the passenger compartment of the car. It is inflated by compressed air from an air tank in the vehicle. Inflation is controlled by solenoid valves actuated by switches responsive to excessive brake pedal pressure, harness tension, or force against the front bumper. The speed of inflation may vary. A manual switch controls a deflation pump which deflates the bag and also mechanically draws it back into its container. Normal repeated use of the brake pedal operates air pumping means to keep up the pressure in the air tank.

2 Claims, 5 Drawing Figures

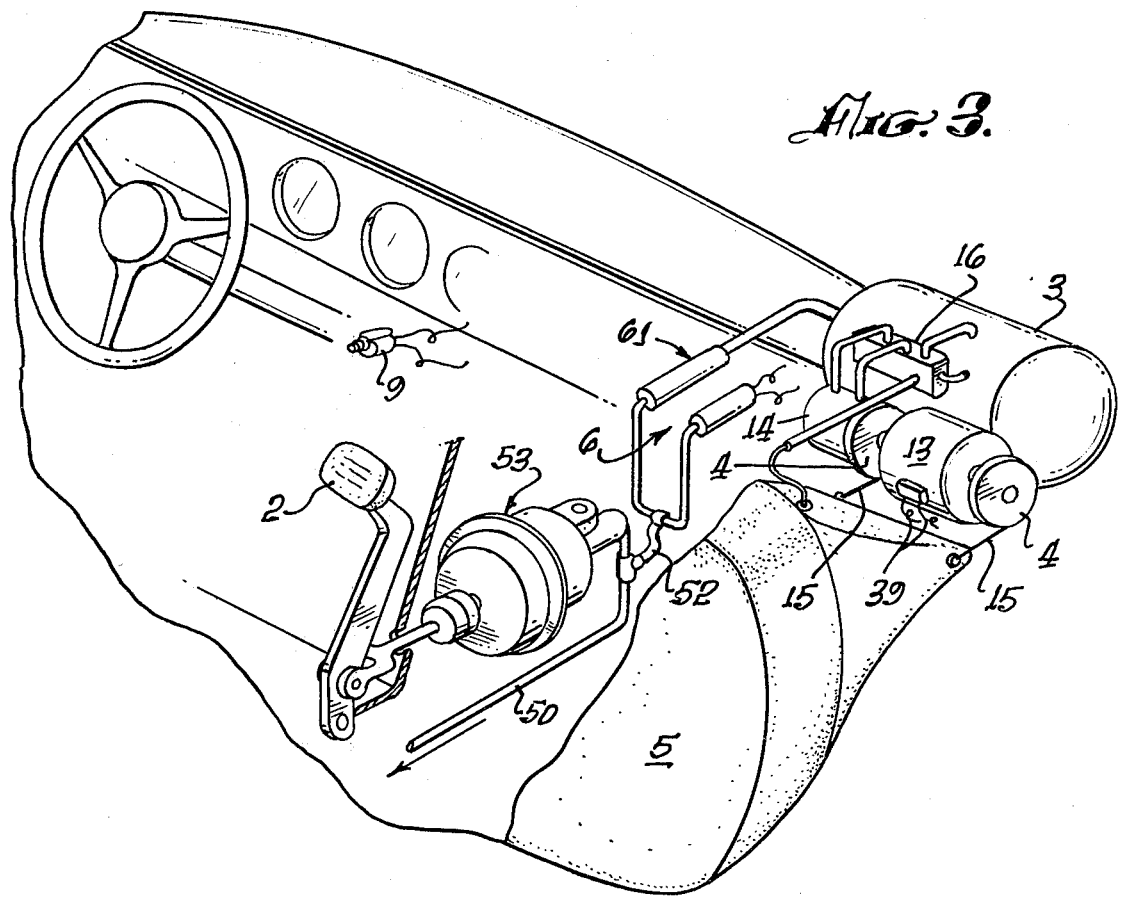
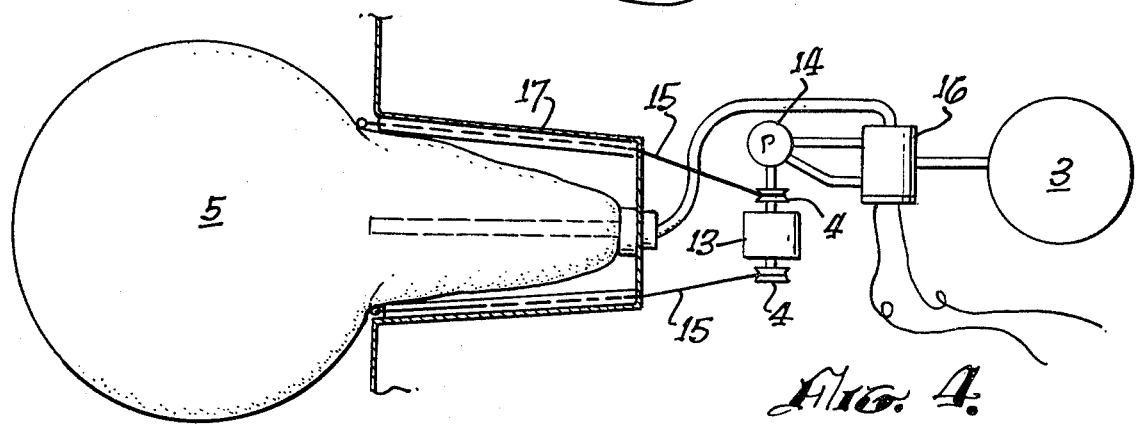

AIR BAG SYSTEM FOR AUTOMOBILES

BACKGROUND

Air bags are a well-known means to protect occupants of vehicles in front-end collisions. The most common types of air bags are inflated irreversably and very rapidly by chemical means. A malfunction in the inflation control apparatus may trigger inflation during normal driving and cause a crash. It is desirable to provide an air bag which begins inflation at a slower rate in advance of actual collision in response to brake pressure, but is also actuable by harness tension or bumper impact, and is readily deflatable.

BRIEF SUMMARY

An air bag is stored in a tapered open container facing the front seat of a car. Compressed air for its inflation is stored in a tank on the vehicle. The tank has an external valve stem, through which it may be initially filled at a service station. A small piston pump operated by the normal repeated use of the brake pedal keeps up the pressure in the tank.

In the hydraulic brake line, a pressure switch responds to excessive brake pedal pressure which signals an emergency situation. The pressure switch energizes a solenoid air valve which admits compressed air from the tank into the air bag at a rate to inflate the bag at a moderate rate, for exambple 1 to 3 seconds to fill it. If the emergency situation does not mature into a crash, the driver has time to deflate the bag by operating a manual switch. The switch controls an electric deflation pump. Pulleys on the pump shaft wind up cords attached to the bag, pulling it back into its tapered container as it deflates.

The air bag is also inflated in response to (1) force against the front bumper closing a bumper switch, and (2) excessive tension in the seat belt or shoulder harness. A pully—with wheel type pully could allow the air to be drawn back into the air tank while rolling the bag into place.

DETAILED DESCRIPTION

IN THE DRAWINGS:

FIG. 3 is a partial cutaway perspective view showing elements of the system;

FIG. 4 is a top sectional view showing the air bag and its container; and

Figure 1:
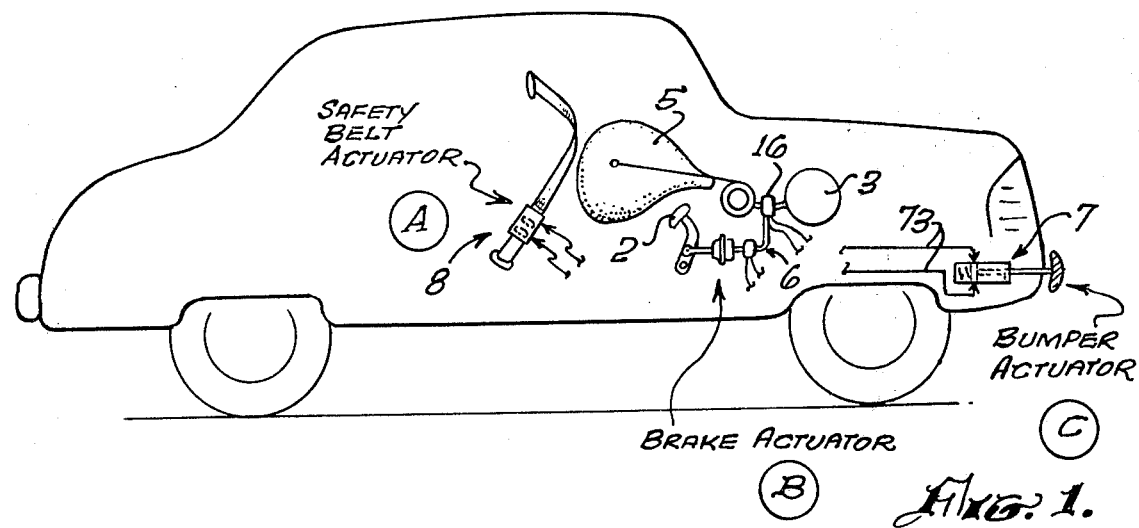
FIG. 1 is a side diagrammatic view of an automobile showing the elements of the invention.

In FIG. 1, the brake pedal is shown at 2, the air tank at 3, the retracting pulleys or drums at 4, and air bag at 5. A brake switch is indicated at 6, a bumper switch at 7, and a shoulder harness switch at 8. All three switches are connected to air valve 16, a solenoid valve that admits air from tank 3 into bag 5.

Figure 2:
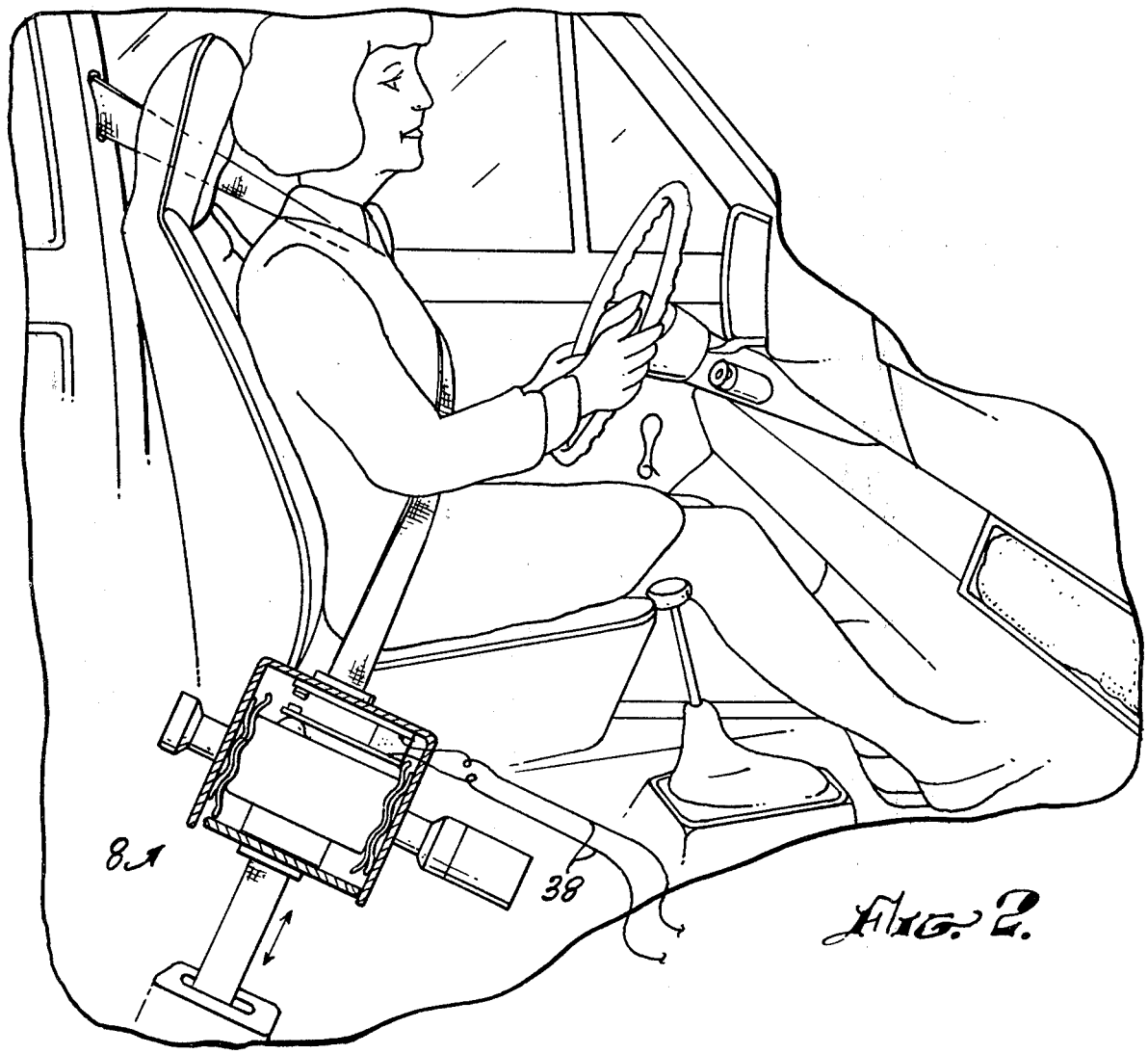
FIG. 2 is a perspective view of a car passenger compartment showing a harness switch.

FIG. 2 shows the harness switch 8 in more detail. Excessive tension operates contacts which are connected by leads 38 to solenoid valve 6 via the car battery (not shown).

Figure 5:
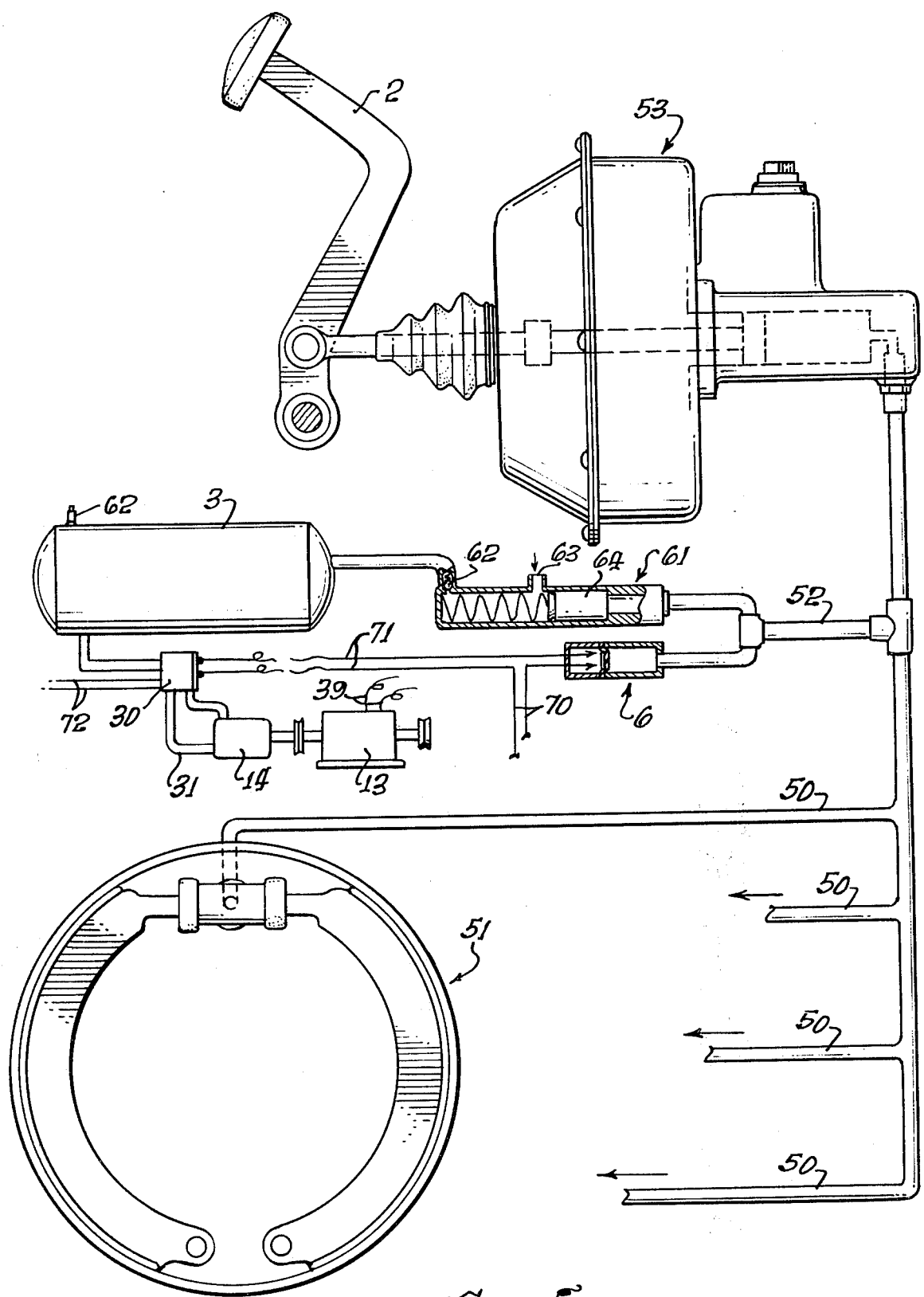
FIG. 5 is a diagram of a hydraulic brake and air bag control system.

In FIGS. 3-5 a conventional brake pedal 2 and master cylinder 53 are connected to a conventional hydraulic brake system through brake lines 50. One of the brakes is indicated at 51. An additional hydraulic line 52 leads to an air pump 61 and brake switch 6. Air pump 61 is of known piston construction with a check valve 62 and an inlet 63. A hydraulic piston 64 is moved to the left in response to normal brake line pressure in normal driving; a suitable air piston at its end cyclically compresses air drawn from inlet 63 and forces it into tank 3 via the check valve 62, keeping up the tank pressure. A valve stem 18 is provided for initially filling the air tank, as at a service station, in the manner of a tire.

Also connected to hydraulic line 52 is brake switch 6, which may be of any suitable construction designed to respond to excessive pressure on the brake pedal 2, well beyond the pressures found in normal driving. Leads 70 go to the car battery, not shown. Leads 71 go to a solenoid-operated air valve 30. When brake switch 6 is closed, valve 30 opens and admits air from tank 30 into line 31, which goes to air bag 5 (FIG. 3).

Also connected to the solenoid valve leads 72, FIG. 5, are the shoulder harness switch 8 via its leads 38 (FIG. 2) and the bumper switch 7 (FIG. 1) via its leads 73, in a manner to open the valve 30 in response to excessive harness tension or to bumper impact.

The deflation system is shown best in FIGS. 3-4. A manual switch 9, which may be on the instrument panel, energizes an electric pump motor 13 via leads 39. Pump 14, of any suitable construction, is driven by the motor. Pump 14 has inlet and outlet connections to solenoid valve 30 connected in a suitable way to deflate the air bag. Pump 14 may pump the air back into tank 3, or alternatively may discharge it to the atmosphere.

Pulleys or drums 4 on the motor shaft, shown best in FIG. 4, are arranged to wind up cords 15 which are attached to air bag 5, so as to draw it mechanically back into its container 17 as it deflates. Container 17 is tapered toward the back to facilitate the re-entrance of the deflated bag.

I claim:

1. An air bag system for a vehicle comprising:
   an open-front bag container with an air bag therein;
   a compressed air tank;
   an electrically-actuated control valve with air line connections to said tank and said bag, and
   a plurality of switches having connections to actuate said valve to inflate said bag and comprising a switch responsive to over-normal brake pedal pressure, a switch responsive to excessive tension in a passenger-restraint device, and a switch responsive to impact force against a bumper of said vehicle; and further comprising
   an air deflation pump with air connections to said valve disposed to deflate said air bag upon operation of said pump;
   an electric motor with a shaft drivably connected to said pump;
   a manual switch in the passenger compartment of said vehicle energizably connected to said motor;
   drums on said shaft, and
   cords connected to said air bag and to said drums;
   said motor winding said cords on said drums to draw said air bag back into said container while driving said deflation pump.

2. A system as in claim 1, further comprising:
   a reciprocating air pump drivably connected to the brake system of said vehicle to execute a pumping stroke with each depression of the brake pedal, and
   an air connection from said air pump to said air tank, whereby normal brake operation is adapted to maintain air pressure in said tank.

* * * * *

UNITED STATES PATENT AND TRADEMARK OFFICE
CERTIFICATE OF CORRECTION

PATENT NO. : 4,258,931
DATED : March 31, 1981
INVENTOR(S) : Joseph K. Lee

It is certified that error appears in the above-identified patent and that said Letters Patent is hereby corrected as shown below:

On the title page, item [76] inventors:

The second named inventor--Richard J. Lee,
                          2205 Calle Taxco
                          West Covina, Calif. 91791--.
                  [should be deleted]

Signed and Sealed this

Sixteenth Day of April 1985

[SEAL]

Attest:

DONALD J. QUIGG

Attesting Officer  Acting Commissioner of Patents and Trademarks